Nov. 15, 1955  C. R. DUNCAN  2,723,711
ADJUSTABLE SEAT HAVING A LATCH CONSTRUCTION
Filed Aug. 5, 1952  2 Sheets-Sheet 1

INVENTOR.
CHARLES R. DUNCAN
BY
Whittemore, Hulbert & Belknap
ATTORNEYS

Nov. 15, 1955  C. R. DUNCAN  2,723,711
ADJUSTABLE SEAT HAVING A LATCH CONSTRUCTION
Filed Aug. 5, 1952  2 Sheets-Sheet 2

INVENTOR.
CHARLES R. DUNCAN
BY
Whittemore, Hulbert & Belknap
ATTORNEYS

United States Patent Office 2,723,711
Patented Nov. 15, 1955

2,723,711

ADJUSTABLE SEAT HAVING A LATCH CONSTRUCTION

Charles R. Duncan, Detroit, Mich., assignor to American Forging & Socket Company, Pontiac, Mich., a corporation of Michigan Application August 5, 1952, Serial No. 302,799

4 Claims. (Cl. 155—14)

The present invention relates to an adjustable seat construction and more particularly to mechanism for locking the seat in adjusted position.

It is an object of the present invention to provide a seat construction including stationary tracks, longitudinally movable slides, lock means including a handle for locking one of said slides relative to its associated track, similar lock means for locking the other slide to its associated track, and linkage mechanism extending between the track-slide constructions for actuation of both of said lock means upon movement of said handle.

More specifically, it is an object of the present invention to provide in an adjustable seat construction lock means at both sides of the seat construction and linkage including a link extending transversely of the seat construction adjacent the front thereof for actuating one of said lock means upon actuation of the other.

It is a further object of the present invention to provide an adjustable seat construction comprising a pair of stationary tracks adapted to be secured to the floor, a pair of slides respectively movable longitudinally of said tracks, anti-friction means interposed between said tracks and slides, interlocking means on said tracks and slides preventing upward movement of said slides relative to said tracks, lock means for each track-slide combination including a lock member having a locking portion movable into a selected one of a series of notches in one of said track or slide members, and linkage interconnecting said lock members including a link extending transversely of the seat construction adjacent the forward end thereof.

Other objects and features of the invention will become apparent as the description proceeds, especially when taken in conjunction with the accompanying drawings, wherein.

Referring now to Figures 1–5 the seat supporting, adjusting, and locking construction comprise a pair of stationary tracks 10 and a pair of longitudinally adjustable slides 12. The tracks 10 are adapted to be secured to the floor as for example of a motor vehicle, and for this purpose are provided adjacent the forward ends thereof with supporting brackets 14, and adjacent the rearward ends thereof with supporting brackets 16.

Figure 3:
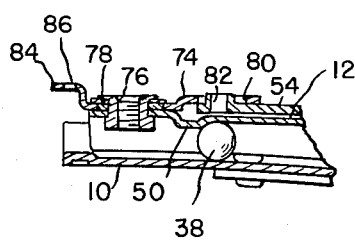
Figure 3 is a section on the line 3—3, Figure 1.
Figure 4:
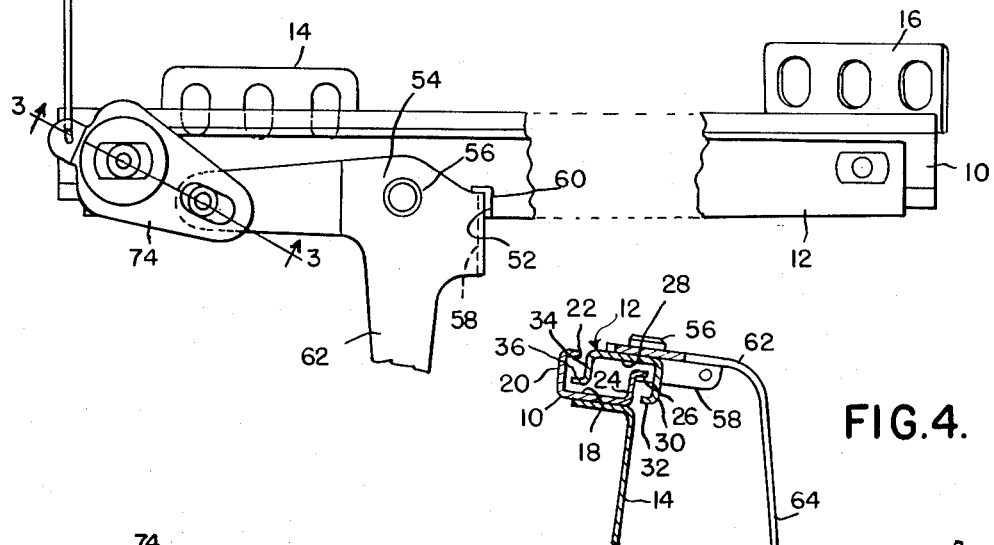
Figure 4 is a fragmentary section on the line 4—4, Figure 2.
Figure 2:
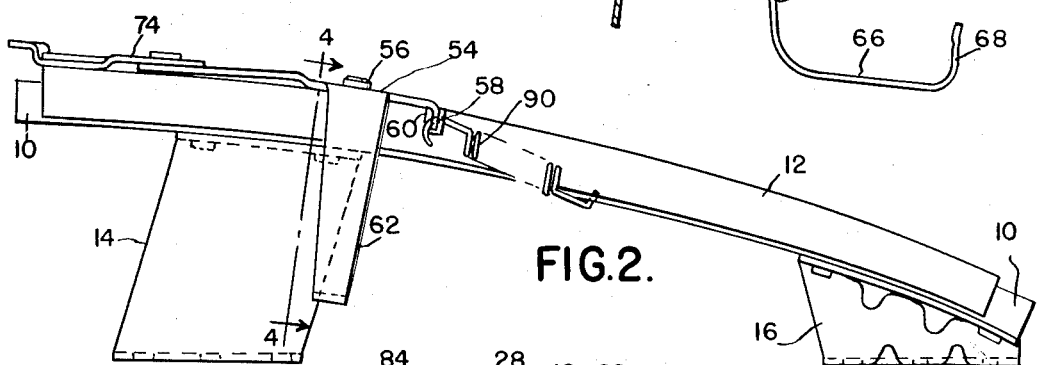
Figure 2 is a fragmentary side elevation of the seat construction shown in Figure 1.
Figure 5:
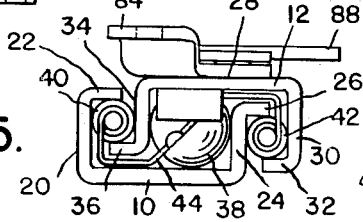
Figure 5 is a fragmentary end view of the track-slide combination looking toward the right in Figure 1.

As best seen in Figure 4, the track 10 comprises a lower flat wall 18, an upstanding side wall 20 terminating at its upper end in an inturned flange 22, and a shorter side wall 24 terminating at its upper end in an outwardly extending flange 26. The slide 12 comprises an upper flat wall 28, a downwardly extending relatively long side wall 30 terminating in an inturned flange 32, and a relatively short downwardly extending side wall 34 terminating in an outwardly extending flange 36. The track 10 and slide 12 are interfitted as illustrated in Figures 4 and 5, and as best seen in Figures 3, 4 and 5 are provided with ball bearings 38 which are provided adjacent the front and rear ends thereof, together with relatively smaller balls 40 and 42. The ball 40 is disposed between the walls 20 and 34 and the ball 42 is disposed between the side walls 24 and 30. It will be observed that the flanges 36 and 32 engage under the balls 40 and 42 respectively and prevent vertical movement of the slide 12 relative to the stationary track 10. At 44 is indicated ball retainer means adapted to retain the balls 38, 40 and 42 in associated relation.

As best seen in Figure 3, the tracks or slides may be provided with formed projections 50 limiting travel of the balls 38 to keep the balls in supporting relation adjacent the ends of the slides 12.

With the construction thus far described, and assuming the slides 12 to be rigidly secured to the underside of a vehicle seat construction, it will be apparent that the seat may be moved forwardly and rearwardly along the arcuate stationary trackway provided by the tracks 10. It is, however, necessary to provide means for locking the seat construction in adjusted position. For this purpose the flange 26 of the track 10 is provided with a series of notches, one of which is illustrated at 52. A locking member 54 is pivoted to the upper surface of the slide 12 as indicated at 56. The locking member 54 includes a downwardly bent edge portion 58. A portion of the top wall 28 and side wall 30 of the slide 12 is cut way as indicated at 60 to permit passage of the locking flange portion 58 therethrough into engagement with a selected one of the notches 52 on the track 10. The locking member associated with the left hand track has an outwardly extending arm 62 which extends downwardly as indicated at 64, thence further outwardly as indicated at 66, and finally upwardly as indicated at 68. A knob or button (not shown) will be carried by the upwardly extending portion 68.

A similar construction is provided at the opposite side of the seat and comprises a locking member 70 pivoted as indicated at 72 to the slide 12. However, locking member 70 is not provided with an operating handle but instead, mechanism is provided which interconnects locking members 54 and 70.

Figure 1:
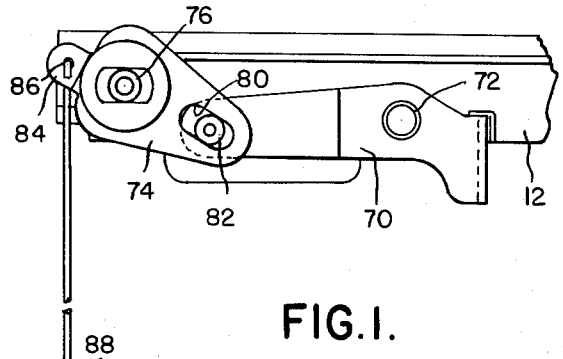
Figure 1 is a fragmentary plan view of a seat construction and locking mechanism.

As disclosed herein, the operating mechanism which interconnects locking members 54 and 70 is arranged to extend across the space between the adjacent track and slide members at the front of the seat construction. This permits the seat construction to extend close to the floor and thus frees the seat construction design from a requirement for providing space for a transverse connecting member intermediate the front and rear ends thereof. Specifically, the mechanism for interconnecting lock members 54 and 70 comprises levers 74 which are pivoted intermediate their ends to the upper wall of the slides 12 by members 76 and annular spacers 78. The rearwardly extending ends of the levers 74 are provided with elongated slots 80 into which extend circular projections 82 formed on the forward ends of the lock members 54 and 70. The forward end of the levers 74 include upwardly offset portions 84 apertured as indicated at 86 for the reception of a cross connecting link 88. Resilient means are provided biasing the left hand locking member 54 in a counterclockwise direction as seen in Figure 1, this means being illustrated as a spring 90 shown in Figure 2. The spring is thus operatively connected to the locking mechanism to retain the mechanism in locked position until the lever or arm 62 is swung forwardly to release the locking mechanism.

Figure 6:
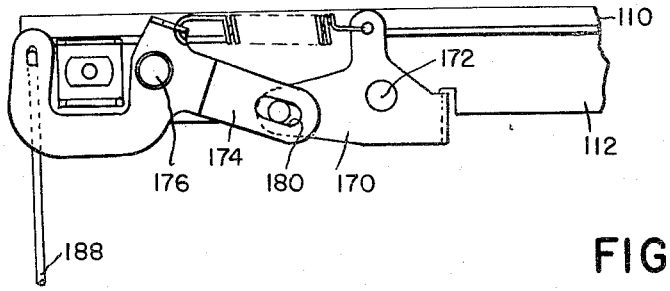
Figure 6 is a fragmentary plan view of a modified form of seat supporting and lock construction.
Figure 7:
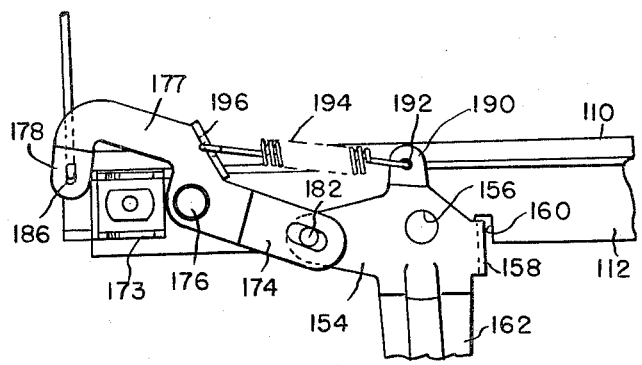
Figure 7 is a side elevation of the structure shown in Figure 6.
Figure 7:
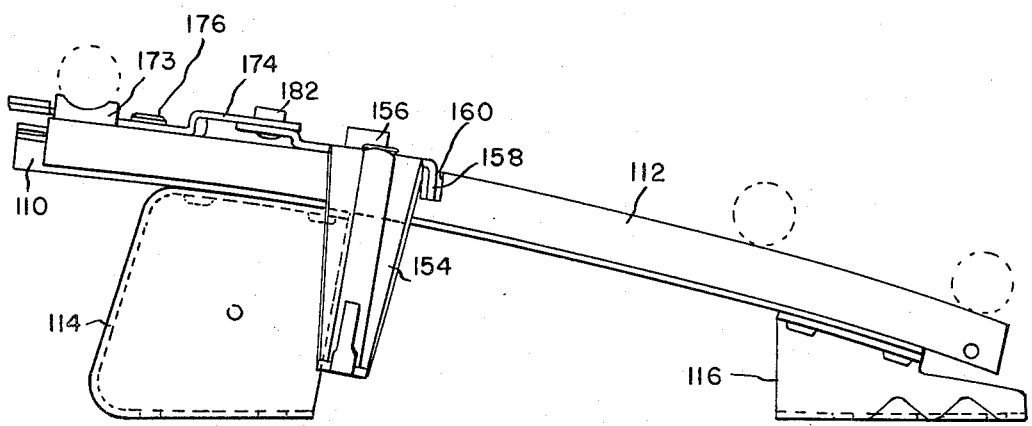

Referring now to Figures 6 and 7 there is illustrated a slightly modified construction in which stationary arcuate tracks 110 are associated with arcuate slides 112. The tracks 110 are supported adjacent their forward ends by brackets 114 and adjacent their rear ends by brackets 116. The track and slide cross sections in this embodiment of the invention may be identical with those disclosed in the previously described embodiment of the invention, or they may be of the type disclosed in Saunders Patent 2,019,159 wherein the tracks and slides each have outwardly extending flanges and one of the flanges includes means extending outwardly beyond the edge of the adjacent flange of the other member and thence inwardly to interlock the flanges and thus prevent lifting of the slide from the track. Rotary bearing members (not shown) are disposed between the tracks and slides adjacent the forward and rearward ends of the slide so as to support the slide on the track for longitudinal adjustment.

Locking means in this embodiment of the invention are generally similar to that disclosed in the previously described embodiment of the invention but are somewhat modified therefrom. The locking mechanism comprises a first lock member 154 pivoted as indicated at 156 to the left hand slide, the lock member including a flange 158 adapted to pass through an opening 160 and to engage with a selected one of a plurality of notches (not shown) provided in the laterally extending flange of the track 110. At the opposite side of the seat construction a second locking member 170 is provided pivoted at 172 to the upper wall of the slide 112 and including a flange adapted to extend through an opening in the slide and to enter a selected one of a series of notches provided in a laterally extending flange of the track 110. Each of the slides 112 is provided adjacent its forward end with a supporting block 173 which is adapted to support a tubular element of the seat frame. Levers 174 are pivoted intermediate their ends as indicated at 176, to the upper wall of the slides 112, and the rearwardly extending ends of the levers are provided with elongated slots 180 which receive upwardly extending projections 182 formed on the forward ends of the lock members 154 and 170. Forwardly of the pivot mountings 176, the levers 174 include offset portions 177 and 178 which are shaped to extend partly around the blocks 173. The forward ends of the levers 174 are provided with elongated slots 186 which are interconnected by a cross link 188. The slots 186 are elongated so as to permit some relative movement between the levers 174. The result of this is that when the lock member 154 is rotated by its handle 162 there is lost motion which permits the lock member 154 to move to unlocked position before the lock member 170 is moved to unlocked position. This sequential movement of the lock members reduces the force required by the operator to release the seat slides for sliding movement.

It will be observed that the cross link 188 is located forwardly of the foremost transverse support member carried by the blocks 173 and that therefore the mechanism intersecting the locking means at opposite sides of the seat construction is provided in a position in which it does not interfere with the seat construction and does not require provision of special means to provide clearance for the link. This permits the actual seat construction to be designed without reference to the locking mechanism and if desired to extend substantially to the floor of the vehicle.

In this embodiment of the invention the lock members 154 and 170 are provided with offset arms 190 having apertures 192 therein receiving the rearward end of tension springs 194, the forward ends of which are secured to openings provided in flanges 196 on the levers 177.

Again, in this construction the means interconnecting the lock members 154 and 170 includes a cross connecting link extending across the space between the track and slide members adjacent the forward end of the seat construction, thus leaving the space beneath the seat construction clear and permitting the seat frame to occupy as much of this space as is desired.

The drawings and the foregoing specification constitute a description of the improved adjustable seat construction in such full, clear, concise and exact terms as to enable any person skilled in the art to practice the invention, the scope of which is indicated by the appended claims.

What I claim as my invention is:

1. An adjustable seat comprising a pair of laterally spaced parallel tracks, a seat construction comprising a pair of parallel slides respectively movable longitudinally on said tracks and a plurality of transverse support members, said tracks each having a longitudinally extending series of notches, a lever pivoted for swinging movement about a vertical axis on and adjacent the forward end of each of said slides, said levers having arms extending forwardly beyond the foremost one of said transverse support members, lock means including elements operatively connected to said levers and movable into and out of said notches upon swinging of said levers, a link connecting said arms and located forwardly of the foremost one of said transverse support members, and resilient means operatively connected to one of said levers to bias said one lever in a direction to cause said elements to engage in said notches.

2. An adjustable seat comprising a pair of laterally spaced parallel tracks, a seat construction comprising a pair of parallel slides respectively movable longitudinally on said tracks and a plurality of transverse support members, a pair of lock levers respectively pivoted adjacent the forward ends of said slides for swinging movement about vertical axes, locking means comprising notches on said tracks and portions on said lock levers movable into and out of said notches on swinging of said lock levers, a pair of motion transfer levers respectively pivoted to said slides forwardly of said lock levers for swinging movement about vertical axes, said motion transfer levers including arms extending forwardly of the foremost one of said transverse support members, means interconnecting the adjacent lock and motion transfer levers, and a link connecting the forward ends of the forwardly extending arms of said motion transfer levers, said link being located forwardly of the foremost one of said transverse support members.

3. An adjustable seat comprising a pair of laterally spaced parallel tracks, a seat construction comprising a pair of parallel slides respectively movable longitudinally on said tracks and a plurality of transverse support members, a pair of lock levers respectively pivoted adjacent the forward ends of said slides for swinging movement about vertical axes, locking means comprising notches on said tracks and portions on said lock levers movable into and out of said notches on swinging of said lock levers, a pair of motion transfer levers located above said respective slides and pivoted thereto forwardly of said lock levers for swinging movement about vertical axes, said motion transfer levers including arms extending forwardly of the forwardmost one of said transverse support members, means interconnecting the adjacent lock and motion transfer levers, a link connecting the forward ends of the forwardly extending arms of said motion transfer levers, said link being located forwardly of the foremost one of said transverse support members, and resilient means connected to one of said lock levers to bias the same in a direction to cause said portions of said lock levers to move into said notches.

4. An adjustable seat comprising a pair of laterally spaced parallel tracks, a seat construction comprising a pair of parallel slides respectively movable longitudinally on said tracks and a plurality of transverse support members, a pair of lock levers respectively pivoted adjacent the forward ends of said slides for swinging movement about vertical axes, locking means comprising notches on said tracks and portions on said lock levers movable into and out of said notches on swinging of said lock levers, a pair of motion transfer levers located above said respective slides and pivoted thereto forwardly of said lock levers for swinging movement about vertical axes, said motion transfer levers including arms extending forwardly of the forwardmost one of said transverse support members, means interconnecting the adjacent lock and motion transfer levers, a link connecting the forward ends of the forwardly extending arms of said motion transfer levers, said link being located forwardly of the foremost one of said transverse support members, a tension spring connecting one of said lock levers to the adjacent motion transfer lever to bias said one lock lever in a direction to cause said portions to engage in said notches, and an operating handle extending laterally outwardly from one of said lock levers.

References Cited in the file of this patent

UNITED STATES PATENTS

| | | |
|---|---|---|
| 2,100,546 | Kramer | Nov. 30, 1937 |
| 2,179,129 | McGregor | Nov. 7, 1939 |
| 2,299,928 | Potter | Oct. 27, 1942 |
| 2,612,208 | Rhodes | Sept. 30, 1952 |